(12) United States Patent
Downing (10) Patent No.: US 10,112,542 B2
(45) Date of Patent: Oct. 30, 2018

(54) DEPLOYING VEHICLE LADDER (71) Applicant: Altec Industries, Inc., Birmingham, AL (US)

(72) Inventor: James A. Downing, Salem, VA (US)

(73) Assignee: Altec Industries, Inc., Birmingham, AL (US)

( * ) Notice: Subject to any disclaimer, the term of this patent is extended or adjusted under 35 U.S.C. 154(b) by 7 days.

(21) Appl. No.: 15/405,791

(22) Filed: Jan. 13, 2017

(65) Prior Publication Data

US 2018/0201195 A1 Jul. 19, 2018

(51) Int. Cl.
*B60R 3/00* (2006.01)
*B60R 3/02* (2006.01)
*E06C 5/02* (2006.01)

(52) U.S. Cl.
CPC . *B60R 3/02* (2013.01); *E06C 5/02* (2013.01)

(58) Field of Classification Search
CPC .................................. B60R 3/02; E06C 5/02
See application file for complete search history.

(56) References Cited

U.S. PATENT DOCUMENTS

| | | | | |
|---|---|---|---|---|
| 3,464,519 A | * | 9/1969 | Whisler | E04G 1/22 182/115 |
| 3,856,150 A | * | 12/1974 | Wellman | B66C 23/344 212/297 |
| 4,336,840 A | * | 6/1982 | Bailey | E21B 19/22 166/77.4 |

FOREIGN PATENT DOCUMENTS

KR 439152 Y1 * 3/2008

OTHER PUBLICATIONS

MK 88 Mobile construction crane Technical Data; Liebherr; Date Printed: Apr. 10, 2017; Date Posted: Unknown; <https://www.liebherr.com/en/usa/products/construction-machines/tower-cranes/mobile-construction-cranes/details/71633.html>.
MK 88 Mobile construction crane; Liebherr; Date Printed: Apr. 10, 2017; Date Posted: Unknown;<https://www.liebherr.com/external/products/products-assets/252619/liebherr-mk88-mobile-construction-crane.pdf>.
REL Stapleton Tailgate Ladder; Kotula's; Date Printed: Apr. 10, 2017; Date Posted: Unknown; <http://www.kotulas.com/deals/rel-stapleton-tailgate-ladder>.

* cited by examiner

*Primary Examiner* — Alvin C Chin-Shue
(74) *Attorney, Agent, or Firm* — Erise IP, P.A.

(57) ABSTRACT

A deploying ladder assembly configured to be associated with a vehicle and configured to be selectively placed into a deployed position and a stowed position, the deploying ladder assembly comprising an outrigger, an actuator, a ladder support, and a ladder. The actuator is associated with the outrigger, and is configured to selectively move the outrigger between the deployed position and the stowed position. The ladder support apparatus configured to be secured to the utility vehicle. The ladder is secured to the outrigger and moveably secured to the ladder support apparatus. The actuator imparts a force on the ladder through the outrigger, such that the ladder is in the deployed position while the outrigger is in the deployed position and the ladder is in the stowed position while the outrigger is in the stowed position.

19 Claims, 8 Drawing Sheets

DEPLOYING VEHICLE LADDER

BACKGROUND

1. Field

Embodiments of the invention relate to utility vehicles and other vehicles. More specifically, embodiments of the invention relate to vehicles that employ outriggers and access ladders.

2. Related Art

The utility vehicles often include access ladders along a side or rear of the utility vehicle. Access ladders allow operators to access a deck, a driver's cab, an operator's cab, a boom assembly, or other component of the utility vehicle. To be convenient for the operator, these ladders extend downward from a vehicle chassis toward the ground. However, these ladders can strike ground or other obstructions, especially in rough terrain conditions. Striking these obstructions can cause damage to the ladder, the utility vehicle chassis, the obstruction, and the like. In order to prevent this damage, vehicles of the prior art have included shorter (e.g., further from the ground) ladders or manually actuated ladders that are lowered by the operator. Shorter ladders are inconvenient as the operator will often be carrying heavy equipment up the ladder. Manually actuated ladders are often neglectfully left extended down.

SUMMARY

Embodiments of the invention solve the above-mentioned problems by providing an automatic deploying ladder assembly. The deploying ladder assembly is associated with an outrigger of the utility vehicle. When the outrigger moves from a stowed position to a deployed position, the outrigger moves the ladder from a stowed position (e.g., upward and difficult to access) to a deployed position (e.g., downward and easy to access). While the outriggers are deployed is the typical time frame in which an operator will access a deck of a chassis of the utility vehicle. The deploying ladder assembly therefore automatically deploys with the outriggers, in embodiments of the invention, so as to provide convenience for the operator and safety for the equipment.

A first embodiment of the invention is generally directed to a deploying ladder assembly configured to be associated with a vehicle and configured to be selectively placed into a deployed position and a stowed position, the deploying ladder assembly comprising an outrigger, an actuator, a ladder support, and a ladder. The actuator is associated with the outrigger, and is configured to selectively move the outrigger between the deployed position and the stowed position. The ladder support apparatus configured to be secured to the utility vehicle. The ladder is secured to the outrigger and moveably secured to the ladder support apparatus. The actuator imparts a force on the ladder through the outrigger, such that the ladder is in the deployed position while the outrigger is in the deployed position and the ladder is in the stowed position while the outrigger is in the stowed position.

A second embodiment of the invention is generally directed to a deploying ladder assembly configured to be associated with a vehicle and configured to be selectively placed into a deployed position and a stowed position. The deploying ladder assembly comprising a ladder support apparatus and a ladder. The ladder support apparatus is configured to be secured to the utility vehicle. The ladder is moveably secured to the ladder support apparatus. The ladder is configured to be pivotably secured to an outrigger of the utility vehicle, such that the ladder is configured to be moved by the outrigger of the utility vehicle. The ladder is therefore in the deployed position while the outrigger is in the deployed position and the ladder is in the stowed position while the outrigger is in the stowed position.

A third embodiment of the invention is generally directed to a method of moving a ladder that is associated with a vehicle from a stowed position to a deployed position, the method comprising the following steps: securing the ladder to an outrigger of the utility vehicle; and elongating an actuator associated with the outrigger of the utility vehicle, wherein elongating the actuator pushes the outrigger from the stowed position to the deployed position, wherein the outrigger traveling from the stowed position to the deployed position pushes the ladder from the stowed position to the deployed position. The method may further comprise the step of shortening the actuator associated with the outrigger of the utility vehicle, wherein shortening the actuator pulls the outrigger from the deployed position to the stowed position, wherein the outrigger traveling from the deployed position to the stowed position pulls the ladder from the deployed position to the stowed position.

Still other embodiments of the invention may be directed to an utility vehicle comprising a base, a boom assembly, and a deploying ladder assembly. The deploying ladder assembly is associated with at least one outrigger of the base so as to be in a deployed position while the outrigger is in a deployed position, and to be in a stowed position while the outrigger is in a stowed position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the invention can include a variety of combinations and/or integrations of the embodiments described herein.

Figure 1:
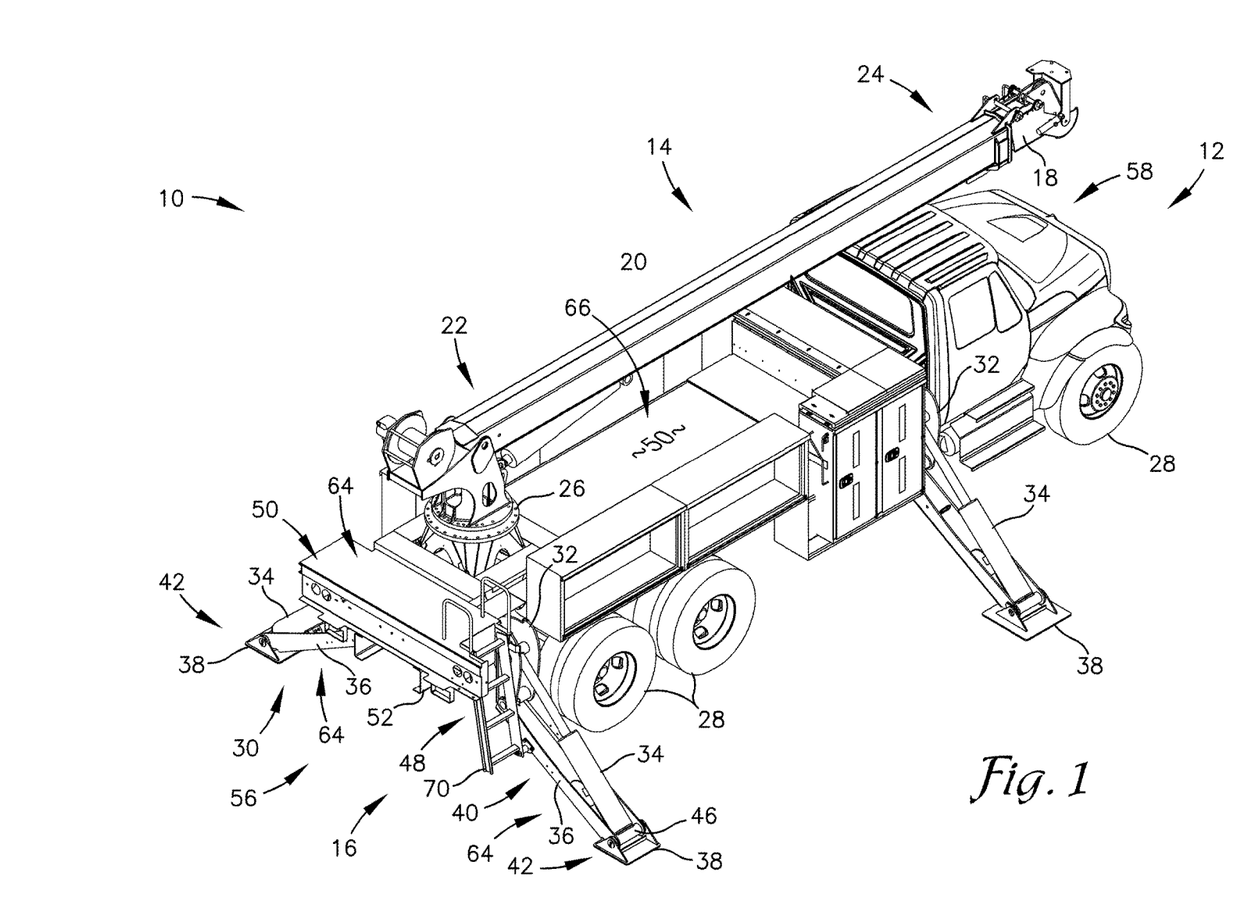
FIG. 1 is a perspective view of a utility vehicle having a deployable ladder assembly thereon, as shown from a rear-right perspective.

Turning now to the drawings, a utility vehicle 10 is illustrated in FIG. 1. Broadly, the utility vehicle 10 comprises a base 12, a boom assembly 14, and a deploying ladder assembly 16. The boom assembly 14 is pivotably and/or rotatably secured to the base 12 so as to perform various tasks. The boom assembly 14 may include an upper boom section 18, an lower boom section 20, and a tool (not illustrated, such as a utility platform, digger derrick, jib, or other tool). The deploying ladder assembly 16 allows an operator to access the base 12 so as to perform various tasks while the utility vehicle 10 is stationary, and preventing damage to the deploying ladder assembly 16 while the utility vehicle 10 is moving.

Before discussing the deploying ladder assembly 16 in detail, the components of the boom assembly 14 and the base 12 will be discussed. The boom assembly 14 broadly comprises the lower boom section 20 and the upper boom section 18. The upper boom section 18 may be insulated for safety reasons. Although not illustrated in FIG. 1, some embodiments of the boom assembly 14 may further comprise at least one pivoting boom section.

The boom assembly 14 presents a proximal end 22 and a distal end 24. The proximal end 22 is rotatably and/or pivotably secured to a boom turret 26 of the base 12. The distal end 24 is configured to be secured to the tool, such as a utility platform assembly. In some embodiments, the at least one upper boom section 18 is at least in part disposed within the lower boom section 20. The at least one upper boom section 18 telescopes to extend or retract into the lower boom section 20. In other embodiments, the upper boom section 18 pivots relative to the lower boom section 20, not illustrated. The pivoting boom section does not telescope out of any other boom section. Instead the pivoting boom section rotates about the base 12, and the first boom section pivots and/or rotates relative to the pivoting boom section.

The distal end 24 of the boom assembly 14 is configured to receive and secure a tool thereto. Examples of a tool include a utility platform assembly, a jib, a load line, pole guide, a digger derrick, and the like. The utility platform assembly provides an elevated surface from which at least one utility worker can perform a task. For example, of the utility platform assembly comprise four bucket sidewalls and a bucket floor that collectively form a cavity. The utility platform assembly may also present a bucket lip along a top portion of at least one bucket sidewall. Other tools may perform other tasks such as lifting a load, digging a hole, or the like.

The base 12 of the utility vehicle 10 is a selectively stabilized platform. In embodiments of the invention, the base 12 is an aerial device (as illustrated in FIG. 1), a digger derrick, a crane base, an oilrig, an earth-working machine, an automobile, or a fixed structure. The base 12 provides stability and a counterweight to a load being supported by the boom assembly 14. The utility vehicle 10 is typically mobile and moves via wheels 28 and/or tracks rotatably secured to the base 12. The operator will then emplace the utility vehicle 10 to be stabilized such that the various tasks may be performed.

Figure 2:
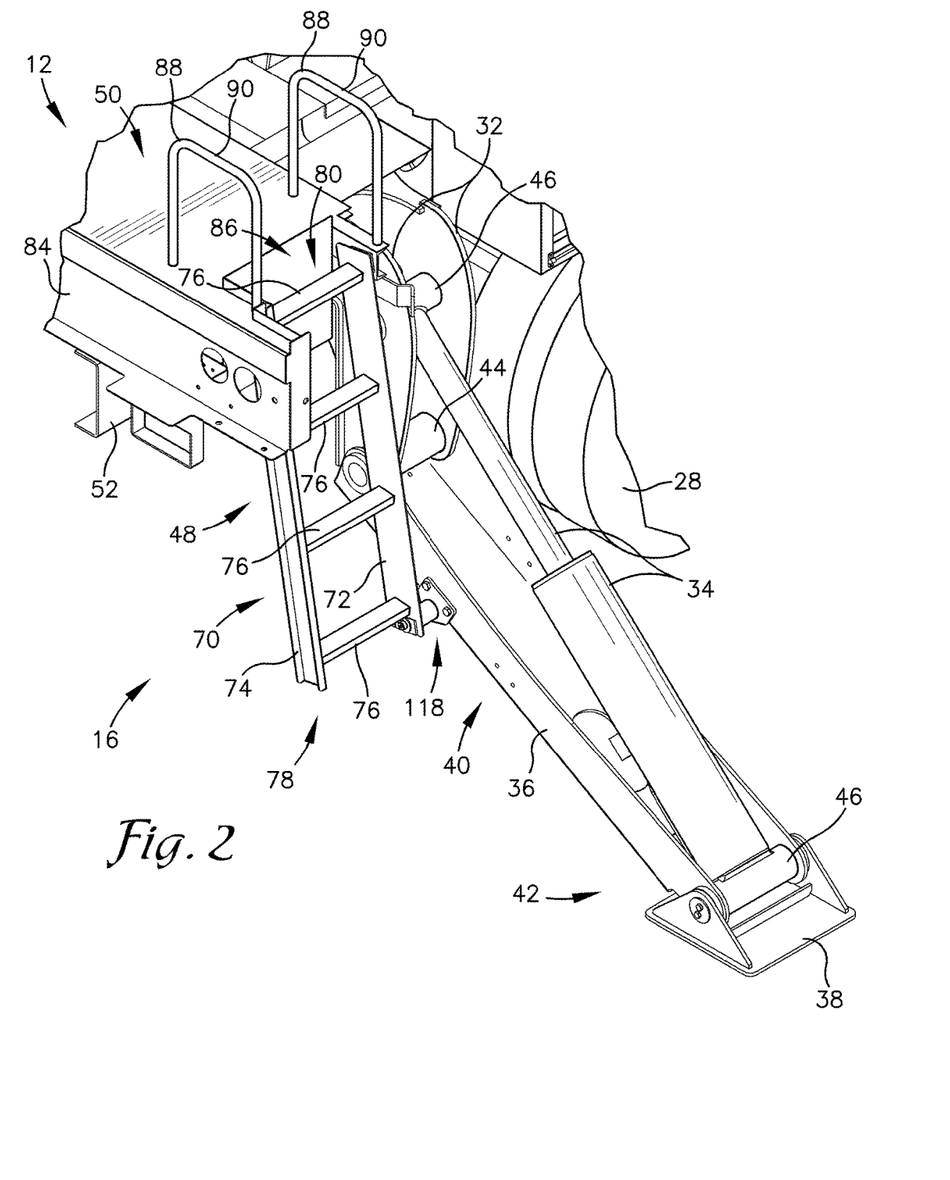
FIG. 2 is a perspective view of the deployable ladder assembly secured to the base of the utility vehicle of FIG. 1, as illustrated in a deployed position.
Figure 3:
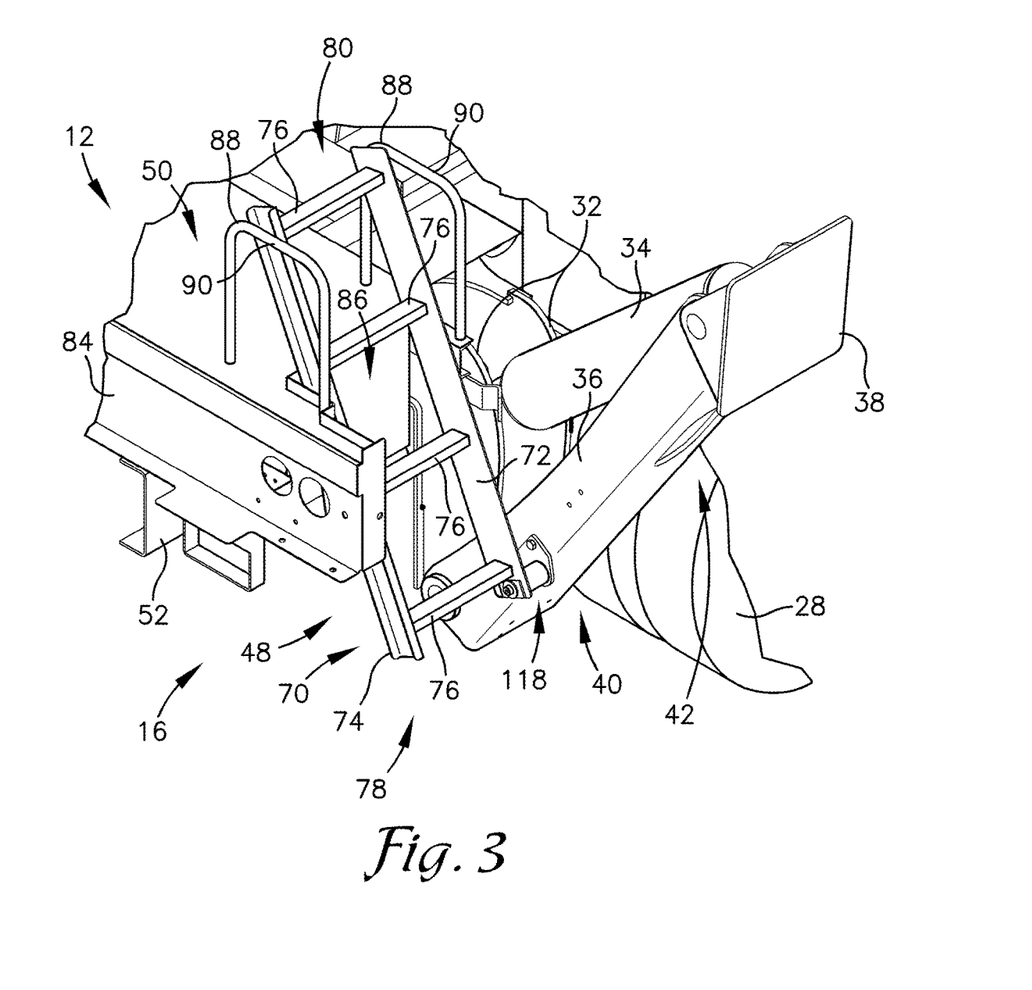
FIG. 3 is a perspective view of the deployable ladder assembly of FIG. 2, as illustrated in a stowed position.

The base 12 of the utility vehicle 10 utilizes at least one outrigger 30 for stabilization. The outriggers 30 typically deploy from within, atop, underneath, or alongside the base 12. The outriggers 30 therefore are configured to be selectively placed into a stowed position and a deployed position (as illustrated in FIGS. 2 and 3, respectively). When the outriggers 30 are in the stowed position, the utility vehicle 10 is free to maneuver via the wheels 28 and/or tracks because the outriggers 30 are not in contact with the ground. When the outriggers 30 are in the deployed position, the utility vehicle 10 is prevented from maneuver because the outriggers 30 are in contact with the ground. In some embodiments, the outriggers 30 lift the wheels 28 and/or track at least a portion off of the ground. This further prevents movement of the utility vehicle 10 and provides a more stable platform for the task to be performed. The outriggers 30 may deploy on terrain that is un-level, slanted, or irregular.

In embodiments of the invention, the base 12 includes a plurality of outriggers 30, such as two, three, four, six, eight, etc. In embodiments of the invention, the outriggers 30 are deployed from the base 12 in a shape (when viewed from above) that is substantially H-shaped (as illustrated in FIG. 1), X-shaped, or other shape. Relative to a forward driving direction, the outriggers 30 may deploy to the sides (as illustrated in FIG. 1), forward and backward, at some intermediate angle therebetween (such as approximately 30 degrees, approximately 45 degrees, approximately 60 degrees relative to the forward/backward direction), etc.

One consideration during the determination of the layout of outriggers 30 relative to the base 12 is the size, shape, and weight distribution of the base 12. For example, if the base 12 is relatively long in the forward direction and relatively thin in the sideways direction, the outriggers 30 may deploy substantially perpendicular to the forward direction (i.e. the sideways direction). This is because the likelihood of the base 12 tipping forward or backward is reduced because of the relative length in the forward direction. A wide base can therefore be achieved via a perpendicular deployment. As another example, if the base 12 is not substantially longer in the forward direction than in the sideways direction, the outriggers 30 may deploy in a diagonal direction relative to the forward direction, in a substantial X-shape when viewed from above. This is because the likelihood of the base 12 tipping forward or backward has not been reduced by the shape of the base 12.

Figure 7:
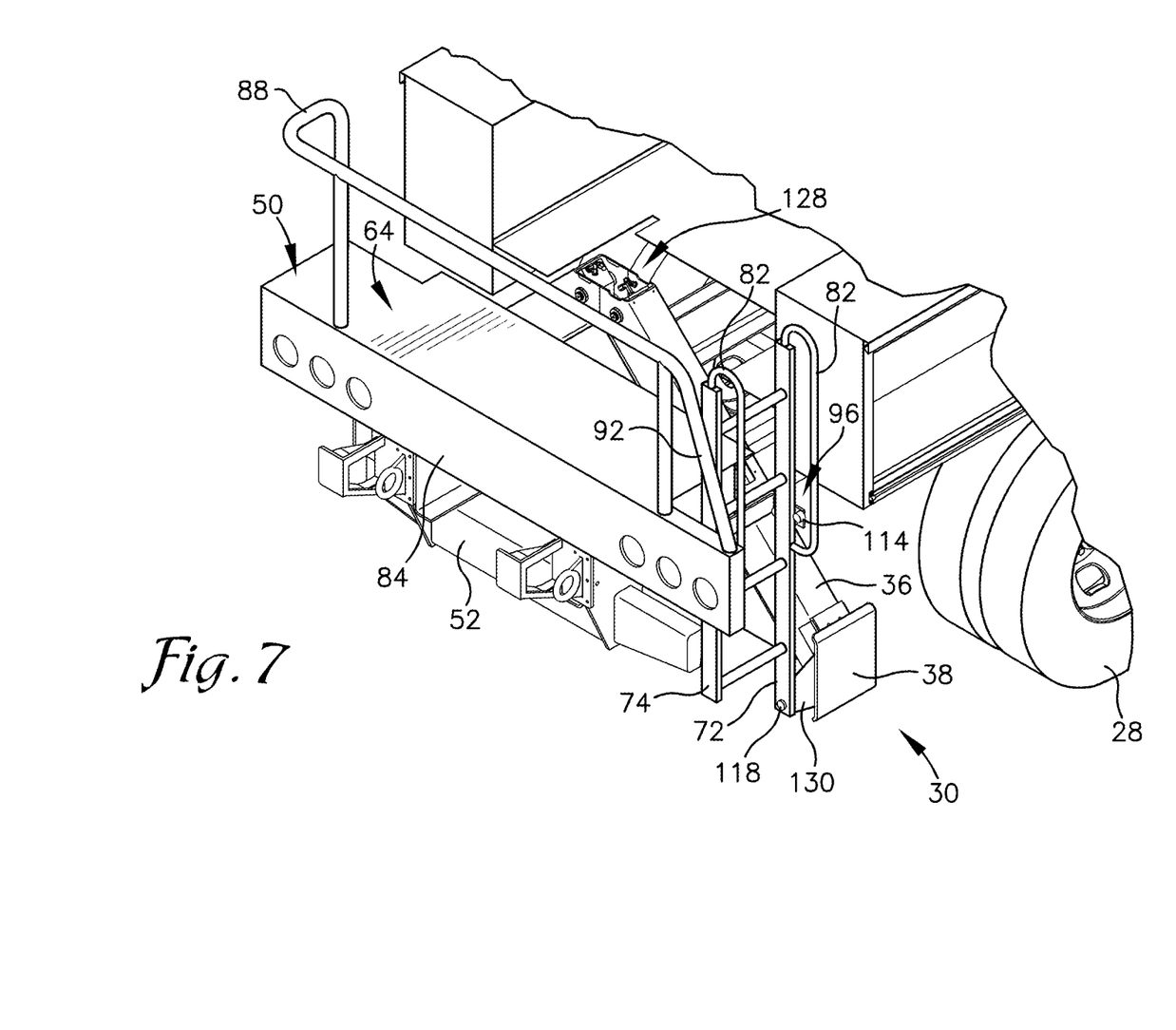
FIG. 7 is a perspective view of yet another embodiment of the deployable ladder assembly, as shown in the stowed position.
Figure 8:
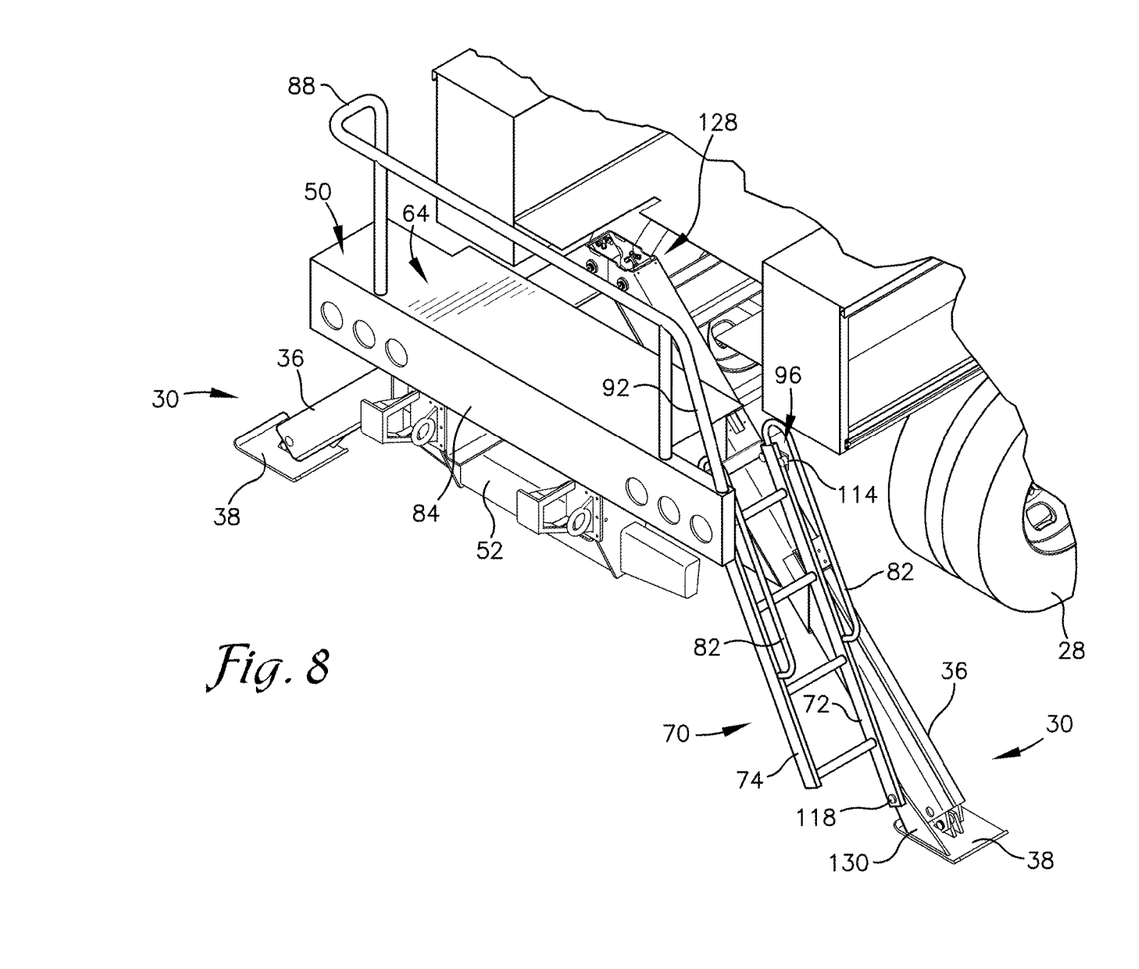
FIG. 8 is a perspective view of the embodiment of FIG. 7, as shown in the deployed position.

As best illustrated in FIG. 2, in embodiments of the invention, each outrigger 30 comprises an outrigger mount 32, an actuator 34, an outrigger leg 36, and an outrigger foot 38. The outrigger mount 32 secures the outrigger 30 to the base 12. The securing may be via a pivot, a recess, or the like. The actuator 34 moves the outrigger 30 from the stowed position to the deployed position. The actuator 34 may operate via a hydraulic cylinder, a pneumatic cylinder, a mechanical actuator 34, an electric motor, or other outrigger-deploying mechanism. The actuator 34 may laterally elongate the outrigger 30 relative to the base 12 (as illustrated in FIGS. 7 and 8), elongate the outrigger 30 downward toward the ground, pivot the outrigger 30 relative to the base 12 (as illustrated in FIGS. 2 and 3), or another configuration for deploying the outriggers 30. In some embodiments, the outrigger 30 must be deployed manually by the utility worker. In some embodiments, the outriggers 30 deploy automatically, such as upon a selection by the utility worker to engage the boom assembly 14.

The outrigger leg 36 is elongated so as to increase the stabilized area of the base 12. The outrigger leg 36 presents a proximal end 40 and a distal end 42. At the proximal end 40, the outrigger leg 36 is secured to the base 12 via the outrigger mount 32. The outrigger leg 36 may therefore include a primary pivot segment 44 for receiving the outrigger mount 32. Similarly, the outrigger leg 36 may include an actuator pivot segment 46 for receiving the actuator 34. At the distal end 42, the outrigger leg 36 is secured to the outrigger foot 38 for securely interfacing with the ground, which may be associated with the actuator pivot segment 46 as illustrated in FIG. 2.

In some embodiments, not illustrated, the outrigger leg 36 comprises an outer outrigger leg and at least one telescoping inner outrigger leg, such that the outrigger leg 36 increases in length via the telescoping inner outrigger leg. In other embodiments, not illustrated, the outrigger leg 36 comprises an outward segment and a downward segment.

In some embodiments, the outriggers 30 deploy in a direction substantially level with the ground. In these embodiments, the outrigger foot 38 may present a substantially elongated vertical shape, such that the outrigger foot 38 may traverse the distance between the outrigger 30 and the ground. In the industry, these types of outriggers 30 are called "out and down" outriggers. In other embodiments, the outriggers 30 deploy by pivoting diagonally downward toward the ground, such as illustrated in FIGS. 2 and 3. In still other embodiments, the outriggers 30 may deploy by extending diagonally downward toward the ground, such as illustrated in FIGS. 7 and 8.

The deploying ladder assembly 16 will now be discussed in more detail. In embodiments of the invention, the deploying ladder assembly 16 is a component of the utility vehicle 10. In other embodiments of the invention, the deploying ladder assembly 16 is configured to be associated with and secured to the utility vehicle 10. The deploying ladder assembly 16 is configured to be selectively placed into a deployed position and a stowed position. In embodiments of the invention, the deploying ladder assembly 16 comprises the outrigger 30, the actuator 34, and a ladder assembly 48. In other embodiments of the invention, the deploying ladder assembly 16 is configured to be added to an existing outrigger 30 and actuator 34 of the utility vehicle 10.

As discussed above, the actuator 34 is associated with the outrigger 30. The actuator 34 is configured to selectively move the outrigger 30 between the deployed position and the stowed position. The ladder assembly 48 is secured to the outrigger 30 and/or to the actuator 34. The ladder assembly 48 is in the deployed position while the outrigger 30 is in the deployed position and the ladder is in the stowed position while the outrigger 30 is in the stowed position. The deploying ladder assembly 16 therefore is capable of being in the deployed position (with both the outrigger 30 and the ladder assembly 48 down, as illustrated in FIG. 2) and the stowed position (with both the outrigger 30 and the ladder assembly 48 up, as illustrated in FIG. 3). As used herein, the "deployed position" and the "stowed position" may refer to the position of the outrigger 30, the position of the actuator 34, the position of the ladder assembly 48, or some combination thereof.

In embodiments of the invention, a single deploying ladder assembly 16 is utilized to provide access to a deck 50 of a chassis 52 of the utility vehicle 10. As illustrated in FIG. 1, the single deploying access ladder may be disposed on a side of the chassis 52 toward a posterior end 56 of the utility vehicle 10, such as on a starboard side behind a rear wheel as illustrated. In other embodiments, the deploying access ladder may be disposed on a port side that is opposite the starboard side. In still other embodiments of the invention, the deploying access ladder may be disposed on a side at an intermediate position 54 substantially between a posterior end 56 and an anterior end 58, such as between a rear wheel and a front wheel on the respective side. In these embodiments, the deploying ladder assembly 16 may not be adjacent to the outrigger 30. As such, the deploying access ladder may include a linkage (not illustrated) that connects the ladder to either a fore outrigger 60 or a rear outrigger 62, so as to transfer the force of the deploying outrigger 30.

In other embodiments, the utility vehicle 10 includes a first deploying ladder assembly 16 and a second deploying ladder assembly (not illustrated). The first deploying ladder assembly 16 may provide the operator with access to a first section of the deck 50 (such as a rear section 64 of the deck 50) and the second deploying ladder assembly 16 may provide the operator with access to a second section of the deck 50 (such as an intermediate section 66 of the deck 50). In other embodiments, the first deploying access ladder may provide access to the deck 50 and the second deploying access ladder may provide access to an operator cabin. In still other embodiments, the first deploying access ladder may provide access to the deck 50 from a starboard side and the second deploying access ladder may provide access to the deck 50 from a port side (or from a back side and a starboard side, respectively; or from a back side and a port side, respectively).

In embodiments of the invention, the ladder assembly 48 comprises a ladder support apparatus 68 and a ladder 70. The ladder support apparatus 68 is configured to secure the ladder 70 to the chassis 52 of the utility vehicle 10. The ladder support apparatus 68 also facilitates the movement of the ladder 70 between the deployed position and the stowed position. In embodiments of the invention, the ladder support apparatus 68 provides a path upon which the ladder 70 can slide while traveling between the deployed position and the stowed position. In other embodiments of the invention, the ladder support apparatus 68 provides a pivot upon which the ladder 70 can pivot while traveling between the deployed position and the stowed position (not illustrated).

In embodiments of the invention, the ladder support apparatus 68 associated with the chassis 52 of the utility vehicle 10. In some embodiments, the ladder support apparatus 68 is a separate component that is configured to be added to the chassis 52. In other embodiments, the ladder support apparatus 68 is a component of the chassis 52 itself. In some embodiments, the ladder support apparatus 68 is disposed toward a posterior end 56 of the utility vehicle 10 (e.g., generally opposite the primary direction of travel). In other embodiments (not illustrated), the ladder support apparatus 68 is disposed along a side of the utility vehicle 10 generally between the anterior end 58 and the posterior end 56.

Figure 6:
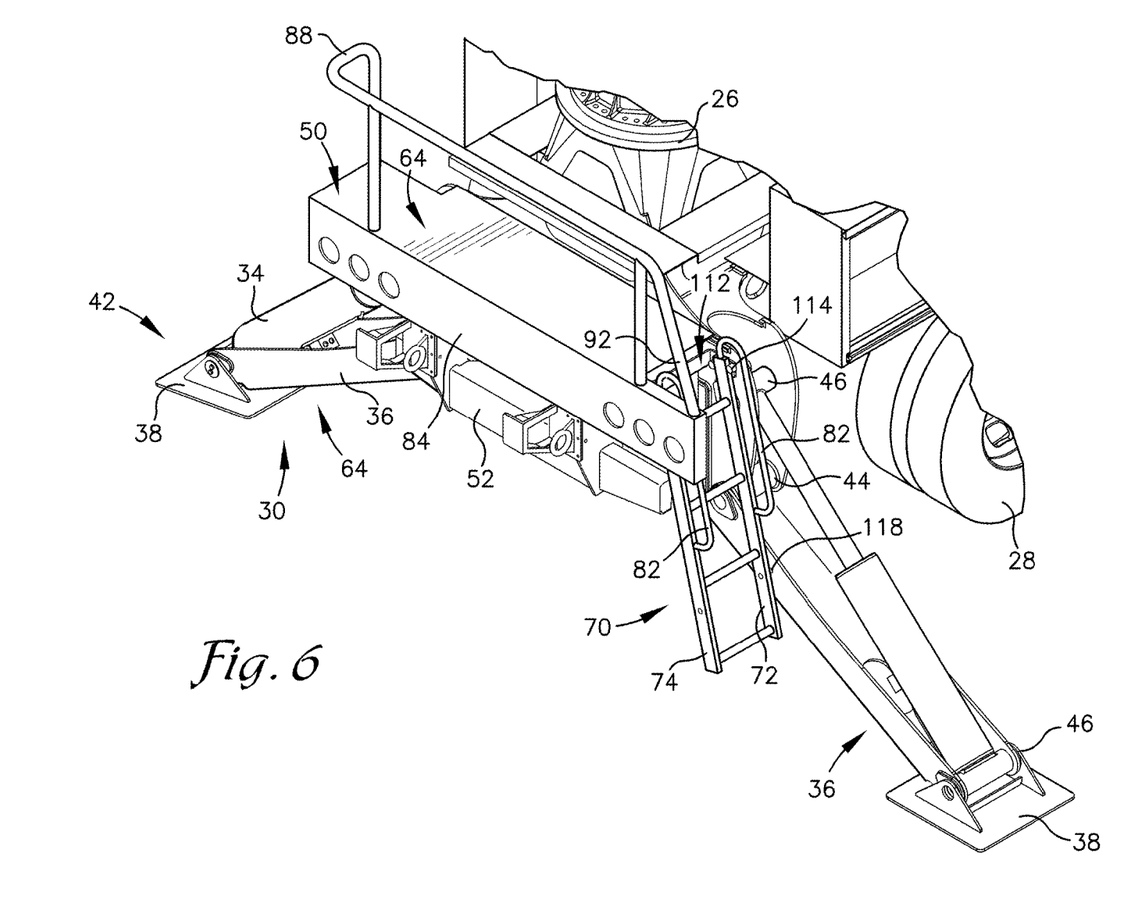
FIG. 6 is a perspective view of another embodiment of the deployable ladder assembly, as shown from a rear-right perspective.

In embodiments of the invention, the ladder 70 includes a first rail 72, a second rail 74, and a plurality of rungs 76 disposed between the first rail 72 and the second rail 74. The first rail 72 and the second rail 74 are each elongated so as to present a lower end 78 and an upper end 80. The first rail 72 is generally parallel with the second rail 74. Each rung 76 is disposed perpendicular to both the first rail 72 and the second rail 74. Each rung 76 is secured to the first rail 72 at a first end and secured to the second rail 74 at a second end. In some embodiments, the ladder 70 includes a handrail 82 configured to be grasped by the operator while climbing or descending the ladder 70, as illustrated in FIG. 6. In some embodiments (not illustrated), the ladder 70 includes a foot pad configured to interface with the ground when in the deployed position.

Figure 5:
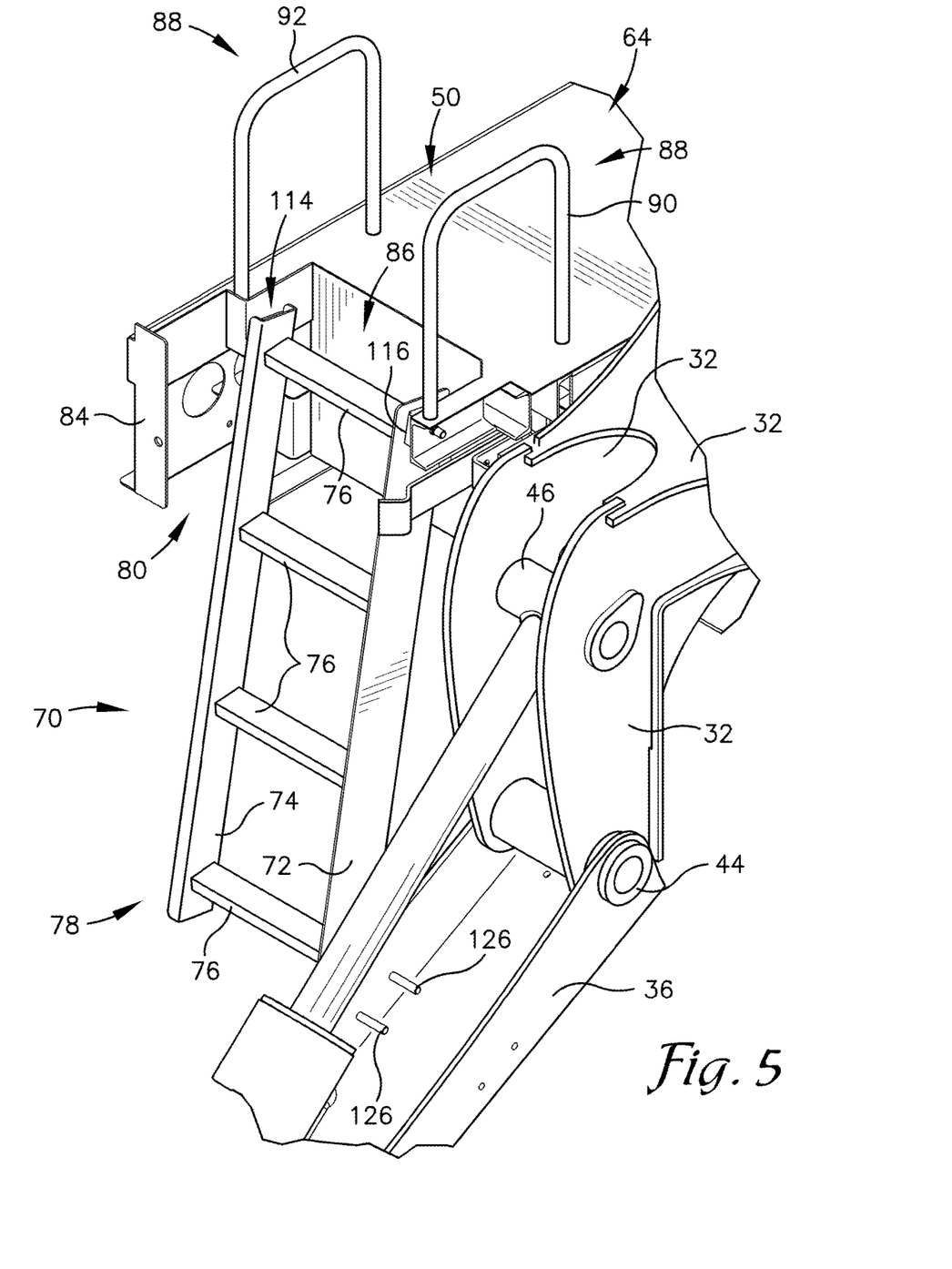
FIG. 5 is a perspective view of the deployable ladder assembly secured to the base of the utility vehicle of FIG. 1, as shown from a forward-right perspective.

The ladder support apparatus 68 will now be discussed in more detail. The ladder support apparatus 68 secures the ladder 70 to the utility vehicle 10 while allowing the ladder 70 to be selectively moved between the deployed position and the stowed position. In embodiments of the invention, such as illustrated in FIGS. 5 and 6, the ladder support apparatus 68 allows the ladder 70 to slide upward and downward between the deployed position and the stowed position. In other embodiments, not illustrated, the ladder support apparatus 68 allows the ladder 70 to pivot upward and downward between the deployed position and the stowed position.

In embodiments of the invention, the ladder support apparatus 68 is associated with a rear bumper 84 of the chassis 52 of the utility vehicle 10. In these embodiments, the deploying ladder assembly 16 is originally manufactured with the utility vehicle 10. The ladder support apparatus 68 may be a component of the rear bumper 84, the chassis 52, or other component of the utility vehicle 10. The ladder support apparatus 68 may include a recess 86 that is complementary so as to receive the ladder 70 therein. The ladder support apparatus 68 may also include an upper handrail 88 configured to be grasped by the operator while ascending and/or descending the ladder 70. The upper handrail 88 may include an anterior-side upper handrail 90 and/or a posterior-side upper handrail 92 disposed on either side of the ladder 70.

In other embodiments of the invention, the ladder support apparatus 68 is secured to the outrigger mount 32 such that the ladder 70 is generally aligned with the outrigger 30. In these embodiments, the deploying ladder assembly 16 may be added to existing utility vehicle 10s and/or originally manufactured with the utility vehicle 10. The ladder support apparatus 68 of these embodiments may include a ladder support bracket 94, as illustrated in FIG. 6, that is configured to be secured to the chassis 52, such as by a mechanical fastener and/or by welding. The ladder support bracket 94 is generally U-shaped so as to fit around the ladder 70.

In embodiments of the invention, the ladder support apparatus 68 includes at least one guide 96 for facilitating the transition of the ladder 70 between the deployed position and the stowed position. In some embodiments, a first-side guide 98 is secured to or otherwise associated with first rail 72 of the ladder 70 and a second-side guide 100 is secured to or otherwise associated with the second rail 74 of the ladder 70. The first-side guide 98 and the second-side guide 100 each facilitate the moving of the respective rail 72,74 between the deployed position and the stowed position.

A few exemplary types of guides 96 are shown in the drawings. Exemplary guides 96 may be described by their location and function. For example, guides 96 may be internal and/or external to the ladder, and guides may be formed of a wheel and/or wear pad. First, at least one guide 96 may be an interior wheel guide. Second, at least one guide 96 may be an interior wear pad guide. Third, at least one guide 96 may be an exterior wheel guide. Fourth, at least one guide 96 may be an exterior wear pad guide. It should be appreciated that various embodiments of the invention may utilize any combination of the four discussed types of guides, and/or other guides that facilitate moving the ladder 70 between the deployed position and the stowed position. In some embodiments, an interior-type guide and an exterior-type guide may be used in concert to secure the ladder 70.

Figure 4:
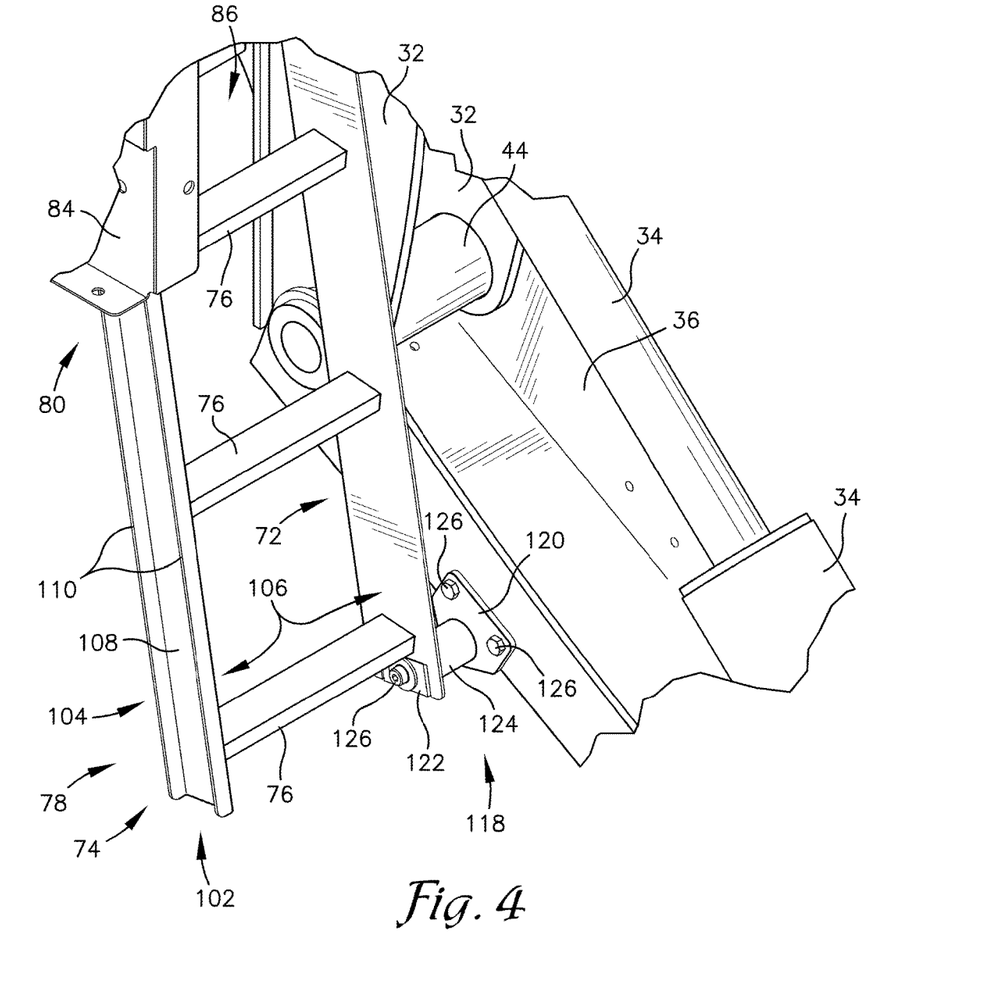
FIG. 4 is a perspective view of the deployable ladder assembly pivotably secured to an outrigger of the base of the utility vehicle of FIG. 1.

The interior wheel guide and the interior wear pad guide are configured to interact with a channel 102 of the rail 72,74 of the ladder 70. The channel 102 is disposed along the rail on an exterior side 104 (e.g., opposite an interior side 106 in which the plurality of rungs 76 are secured to the respective rail 72,74). The channel 102 is generally parallel to the rail, so as to allow the guide 96 to move along the rail while remaining generally aligned. In these embodiments, the rail may include a rung-support plate 108 and at least one side plate 110 extending therefrom, as best illustrated in FIG. 4. The side plates 110 are configured to keep the guide 96 therebetween. The side plates 110 may also include a lip (not illustrated) for retaining the guide 96 within the channel 102.

Some embodiments of the invention utilize a mixed configuration. For example, the first-side guide 98 is the interior wheel guide, which is complementary to a first channel of the first rail 72 such that the first-side guide 98 slides at least partially within the channel 102; and the second-side guide 100 is a wear pad guide, which is complementary to a second channel of the second rail 74 such that the second-side guide 100 slides at least partially within the second channel. Other configurations may also be used.

The exterior wheel guide and the exterior wear pad guide are configured to interact with at least one exterior side 104 of the rail. The exterior side 104 of the rail is generally flat so as to allow the wear pad guide to slide therealong. The exterior wheel guide and the exterior wear pad guide each present a gap 112. The gap 112 is configured to receive the respective rail therein. The gap 112 may present a width that is substantially the same as or slightly larger than a corresponding width of the respective rail 72,74. The rail 72,74 therefore fits within the gap 112, and the gap 112 keeps the rail aligned in the desired orientation (as discussed below).

It should be appreciated that in embodiments of the invention, the ladder 70 remains substantially in a single desired orientation in both the stowed position and the deployed position (as well as at intermediate positions between the deployed position and the stowed position). The desired orientation is best illustrated in FIGS. 1-3. This desired orientation may be substantially vertical or diagonal, with respect to a vertical axis through the utility vehicle 10 chassis 52. In various embodiments of the invention, the desired orientation is in the range of −10 degrees to 60 degrees from vertical, from 0 degrees to 40 degrees from vertical, from 10 degrees to 20 degrees from vertical, or another range. The desired orientation may be influenced by the pivot location in which the ladder 70 is pivotably connected to the outrigger 30. The first-side guide 98 and the second-side guide 100 may fix the ladder 70 into the desired orientation or may passively allow the ladder 70 to change orientation slightly in the process of moving between the stowed position and the deployed position. It should therefore be appreciated that in some embodiments the orientation in the stowed position may differ from the orientation in the deployed position.

In embodiments of the invention, the exterior wheel guide and the interior wheel guide include a roller 114. The roller 114 is free spinning so as to allow the ladder 70 being pulled by the outrigger 30 to passively move along the guide 96. In other embodiments, the roller 114 may be powered so as to assist or force the ladder 70 from the stowed position to the deployed position (and from the deployed position to the stowed position). The roller 114 is configured to freely rotate about the base. The wheel guide extends the roller 114 from the ladder support apparatus 68 so as to align the roller 114 with the rail. The exterior wheel guide may include two roller 114s so as to keep the rail disposed therebetween. The interior wheel guide may include one roller 114 so as to remain within the channel 102.

In embodiments of the invention, the exterior wear pad guide and the interior wear pad guide include a wear pad 116, as illustrated in FIG. 5. A wear pad 116 may be formed of a hardened polymer, so as to allow the ladder 70 (which may be formed of metal) to slide against the wear pad 116 without causing damage to the ladder 70. The wear pad 116 may also be configured to be removed and replaced upon damage. In embodiments of the invention, the wear pad 116 presents a generally rectangular shape. The rectangular shape of the wear pad 116 is complementary to an interior shape of the channel 102 of the rail.

In embodiments of the invention, the first-side guide 98 is configured to allow the first rail 72 to slide relative thereto while the ladder 70 is moving between the deployed position and the stowed position, and the second-side guide 100 is configured to allow the second rail 74 to slide relative thereto while the ladder 70 is moving between the deployed position and the stowed position.

In embodiments of the invention, the lower end 78 of the ladder 70 is pivotably secured to the proximal end 40 of the outrigger leg 36. The lower end 78 is pivotably secured at a ladder-outrigger interface 118. The ladder-outrigger interface 118 allows the outrigger 30 to transfer movement of the outrigger 30 to the ladder 70. The ladder-outrigger interface 118 may be selected such that the location of the ladder-outrigger interface 118 is substantially aligned with the desired orientation while the deploying ladder assembly 16 is in both the deployed position and the stowed position.

In embodiments of the invention, the ladder-outrigger interface 118 comprises an outrigger bracket 120, a ladder bracket 122, and a traversing member 124. The outrigger bracket 120 is secured to the outrigger 30, as shown in FIG. 4. The outrigger bracket 120 may be secured by welding and/or with at least one fastener 126 (as may be the case in embodiments of the invention configured to be added to existing outriggers 30). The ladder bracket 122 is secured to the lower end 78 of the first rail 72 of the ladder 70. Both the outrigger bracket 120 and the ladder bracket 122 are fixedly secured to their respective components.

The traversing member 124 is disposed between the outrigger bracket 120 and the ladder bracket 122. In embodiments of the invention, the traversing member 124 includes a ladder-side pivot and the outrigger-side pivot. The ladder-side pivot is secured to the ladder bracket 122, and the outrigger-side pivot is secured to the outrigger bracket 120. The ladder-side pivot is pivotably secured to the outrigger-side pivot, such that the ladder-side pivot and the outrigger-side pivot can each axially rotate relative to the other. The traversing member 124 may include an annular bearing or other bearing to facilitate the rotation.

As discussed above, the actuator 34 is configured to pivot the outrigger 30 generally downward when moving from the stowed position to the deployed position. The actuator 34 pushes or pulls the outrigger 30. The outrigger 30 is secured to the ladder 70 at the ladder-outrigger interface 118. As such, when the outrigger 30 moves as pushed or pulled by the actuator 34, the ladder 70 moves in a corresponding direction. For example, if the outrigger 30 moves from the stowed position to the deployed position by pivoting downward (as shown in FIG. 3 to as shown in FIG. 2), the ladder 70 correspondingly moves from the stowed position to the deployed position by sliding downward (as also shown in FIG. 3 to as shown in FIG. 2). The ladder-outrigger interface 118 may therefore be located on the outrigger 30 such that the ladder-outrigger interface 118 moves generally straight downward as the outrigger 30 pivots therearound.

In embodiments of the invention, the ladder 70 of the ladder assembly 48 is pulled generally downward by the outrigger 30 that is being pivoted generally downward by the actuator 34. In other embodiments of the invention, the ladder 70 of the ladder assembly 48 is pivoted generally downward by the outrigger 30 that is being pushed straight outward by the actuator 34 (such as in embodiments that use an out-and-down style outrigger 30, not illustrated in the drawings).

In still other embodiments, the outriggers 30 are in an A-frame configuration, as illustrated in FIGS. 7 and 8. In the A-frame configuration, the opposing outriggers 30 meet at an apex 128 that is disposed therebetween. The apex 128 may extend through the deck 50, or may be disposed below the deck 50. The A-frame configuration includes outriggers 30 that are generally at a higher angle relative to the ground. In the A-frame configuration, the outriggers 30 deploy by extending laterally (as can be seen by comparing FIG. 7 to FIG. 8, in which the outrigger 30 is stowed and deployed, respectively). This is distinct from the outriggers 30 of FIGS. 2 and 3 which deploy by pivoting upward and downward.

In these embodiments, as shown in FIGS. 7 and 8, the lower end 78 of the ladder 48 may be disposed at or adjacent to the distal end 42 of the outrigger leg 36. In some embodiments, the lower end 78 of the ladder 48 may be secured to a ladder protrusion 130 of the outrigger foot 38. In the stowed position (as illustrated in FIG. 7), the ladder assembly 48 is substantially or approximately vertical. In the deployed position (as illustrated in FIG. 8), the ladder assembly 48 is substantially or approximately aligned with the outrigger leg 36. In these embodiments, the ladder assembly 48 pivots while sliding along the guides 96. The outrigger therefore pulls the ladder assembly 48 in a substantially straight line that is aligned with the outrigger leg 36.

While methods of using, deploying, and operating the above-discussed components have been discussed throughout, a method of utilizing embodiments of the invention will now be discussed for clarity. In embodiments of the invention, a method of moving a ladder 70 that is associated with a vehicle from a stowed position to a deployed position, the method comprising the following steps: securing the ladder 70 to an outrigger 30 of the utility vehicle 10; and elongating an actuator 34 associated with the outrigger 30 of the utility vehicle 10, wherein elongating the actuator 34 pushes the outrigger 30 from the stowed position to the deployed position, wherein the outrigger 30 traveling from the stowed position to the deployed position pushes the ladder 70 from the stowed position to the deployed position. The method may further comprise the step of shortening the actuator 34 associated with the outrigger 30 of the utility vehicle 10, wherein shortening the actuator 34 pulls the outrigger 30 from the deployed position to the stowed position, wherein the outrigger 30 traveling from the deployed position to the stowed position pulls (or otherwise applies a force to) the ladder 70 from the deployed position to the stowed position.

In embodiments of the invention, a method of installing a deploying ladder assembly 16 onto a utility vehicle 10 may comprise the steps of removing the recess 86 from the chassis 52 or rear bumper 84 of the utility vehicle 10; securing the ladder support into the recess 86; securing the ladder 70 to the ladder support such that at least one rail of the ladder 70 interfaces with the at least one wheel guide 96; securing the ladder-outrigger interface 118 to the proximal end 40 of the outrigger leg 36; and securing the lower end 78 of the ladder 70 to the ladder-outrigger interface 118, such that the outrigger leg 36 is pivotably secured to the ladder 70 so as to transfer forces from the outrigger leg 36 to the ladder 70.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A deploying ladder assembly configured to be associated with a utility vehicle and configured to be selectively placed into a deployed position and a stowed position, the deploying ladder assembly comprising:
   an outrigger of the utility vehicle;
   an actuator connected to the outrigger,
   wherein the actuator selectively moves the outrigger between the deployed position and the stowed position;
   a ladder support apparatus configured to be secured to the utility vehicle; and
   a ladder secured to the outrigger and moveably secured to the ladder support apparatus,
   wherein the actuator imparts a force on the ladder through the outrigger so as to selectively move the ladder concurrently with the outrigger,
   wherein the ladder is in the deployed position while the outrigger is in the deployed position and the ladder is in the stowed position while the outrigger is in the stowed position.

2. The deploying ladder assembly of claim 1, wherein the outrigger comprises:
   an outrigger mount configured to be secured to a chassis of the utility vehicle;
   an outrigger leg extending outward from the outrigger mount; and
   an outrigger foot configured to interface with a ground surface.

3. The deploying ladder assembly of claim 2, wherein the ladder includes:
   a first rail,
   a second rail, and
   a plurality of rungs disposed between the first rail and the second rail.

4. The deploying ladder assembly of claim 3, wherein the ladder support apparatus is secured to the outrigger mount such that the ladder is generally aligned with the outrigger.

5. The deploying ladder assembly of claim 3, wherein the ladder support apparatus is associated with a rear bumper of the chassis of the utility vehicle.

6. The deploying ladder assembly of claim 3,
   wherein the ladder support apparatus includes a first-side guide and a second-side guide,
   wherein the first-side guide is configured to allow the first rail to slide relative thereto while the ladder is moving between the deployed position and the stowed position,
   wherein the second-side guide is configured to allow the second rail to slide relative thereto while the ladder is moving between the deployed position and the stowed position.

7. The deploying ladder assembly of claim 6,
   wherein a lower end of the first rail of the ladder is pivotably secured to a proximal end of the outrigger,
   wherein the actuator is configured to pivot the outrigger generally downward when moving from the stowed position to the deployed position,
   wherein the ladder of the ladder assembly is pulled generally downward by the outrigger that is being pivoted generally downward by the actuator.

8. The deploying ladder assembly of claim 6,
   wherein the first-side guide is a wheel,
   wherein the wheel is complementary to a first channel of the first rail such that the first-side guide slides at least partially within the first channel.

9. The deploying ladder assembly of claim 6,
   wherein the second-side guide is a wear pad,
   wherein the wear pad is complementary to a second channel of the second rail such that the second-side guide slides at least partially within the second channel.

10. The deploying ladder assembly of claim 1, wherein the ladder and the outrigger are both lower in the deployed position than in the stowed position.

11. A deploying ladder assembly configured to be associated with a utility vehicle and configured to be selectively placed into a deployed position and a stowed position, the deploying ladder assembly comprising:
    a ladder support apparatus configured to be secured to the utility vehicle; and
    a ladder moveably secured to the ladder support apparatus,
    wherein the ladder is pivotally secured to an outrigger of the utility vehicle so as to selectively move the ladder concurrently with the outrigger,
    wherein the ladder is moved by the outrigger of the utility vehicle,
    wherein the ladder is in the deployed position while the outrigger is in the deployed position and the ladder is in the stowed position while the outrigger is in the stowed position.

12. The deploying ladder assembly of claim 11, wherein the ladder includes:
    a first rail,
    a second rail, and
    a plurality of rungs disposed between the first rail and the second rail.

13. The deploying ladder assembly of claim 11, wherein the ladder support apparatus is secured to the outrigger mount such that the ladder is generally vertically aligned with the outrigger.

14. The deploying ladder assembly of claim 11, wherein the ladder support apparatus is associated with a rear bumper of the chassis of the utility vehicle.

15. The deploying ladder assembly of claim 11,
wherein the ladder support apparatus includes a first-side guide and a second-side guide,
wherein the first-side guide is configured to allow the first rail to slide relative thereto while the ladder is moving between the deployed position and the stowed position,
wherein the second-side guide is configured to allow the second rail to slide relative thereto while the ladder is moving between the deployed position and the stowed position.

16. The deploying ladder assembly of claim 12,
wherein a lower end of the first rail of the ladder is pivotably secured to a proximal end of the outrigger, wherein the outrigger includes an actuator that is configured to pivot the outrigger generally downward when moving from the stowed position to the deployed position,
wherein the ladder of the ladder assembly is pulled generally downward by the outrigger that is being pivoted generally downward by the actuator.

17. The deploying ladder assembly of claim 15,
wherein the first-side guide is a wheel,
wherein the wheel is complementary to a first channel of the first rail such that the first-side guide slides at least partially within the first channel.

18. The deploying ladder assembly of claim 15,
wherein the second-side guide is a wear pad,
wherein the wear pad is complementary to a second channel of the second rail such that the second-side guide slides at least partially within the second channel.

19. The deploying ladder assembly of claim 11, wherein the ladder and the outrigger are both lower in the deployed position than in the stowed position.

\* \* \* \* \*